United States Patent
Kacher et al.

(10) Patent No.: US 8,416,764 B2
(45) Date of Patent: Apr. 9, 2013

(54) SYSTEM AND METHOD FOR OBJECT REGISTRATION IN A VOIP ENVIRONMENT

(75) Inventors: Christopher J. Kacher, Concord, MA (US); Richard W. Shea, Maynard, MA (US); David R. White, Hollis, NH (US)

(73) Assignee: Aspect Software, Inc., Chelmsford, MA (US)

( * ) Notice: Subject to any disclaimer, the term of this patent is extended or adjusted under 35 U.S.C. 154(b) by 1329 days.

(21) Appl. No.: 11/888,986

(22) Filed: Aug. 2, 2007

(65) Prior Publication Data

US 2008/0031230 A1 Feb. 7, 2008

Related U.S. Application Data

(60) Provisional application No. 60/835,337, filed on Aug. 3, 2006.

(51) Int. Cl.
*H04L 12/66* (2006.01)

(52) U.S. Cl. .......................... 370/352; 717/108; 717/170

(58) Field of Classification Search .................. 370/352, 370/360, 367, 385, 400, 401; 717/116, 107, 717/108, 120, 121, 165, 170
See application file for complete search history.

(56) References Cited

U.S. PATENT DOCUMENTS

| | | | | |
|---|---|---|---|---|
| 2002/0146159 A1* | 10/2002 | Nolte | .............................. | 382/128 |
| 2004/0015849 A1* | 1/2004 | Sanchez, II | .................... | 717/116 |
| 2005/0044188 A1* | 2/2005 | Nakazawa et al. | ............ | 709/219 |
| 2006/0130070 A1* | 6/2006 | Graf | .............................. | 719/318 |
| 2006/0165106 A1* | 7/2006 | Nishiki et al. | ................. | 370/401 |

* cited by examiner

*Primary Examiner* — Hassan Phillips
*Assistant Examiner* — Ajay Cattungal
(74) *Attorney, Agent, or Firm* — Husch Blackwell LLP

(57) ABSTRACT

A mechanism for managing software modules in a VOIP service is discussed. A component management agent is provided for each VOIP software component in the VOIP environment. The component management agent registers with a session management agent which is in communication with a session management software facility. The component management agent accepts registrations from each software module in the component that it represents. The software module registrations indicate the type of objects that the software module supports. Subsequent managed object requests received from the session management facility are automatically directed to the appropriate software modules based on the registration information. Additionally, the session management agent and component management agent perform format conversions for the managed object requests where the session management facility and software modules are utilizing different object systems.

24 Claims, 5 Drawing Sheets

SYSTEM AND METHOD FOR OBJECT REGISTRATION IN A VOIP ENVIRONMENT

RELATED APPLICATION

This application claims priority to U.S. Provisional Patent Application Ser. No. 60/835,337, filed Aug. 3, 2006, the contents of which are hereby incorporated by reference.

FIELD OF THE INVENTION

The illustrative embodiment of the present invention relates generally to a Voice over Internet Protocol (VoIP) environment, and more particularly to a method of registering objects in a VoIP environment.

BACKGROUND

The Voice over Internet Protocol (VoIP) is a protocol that allows a user to make telephone calls using an Internet connection rather than a traditional analog telephone connection. With VoIP, the caller's voice signal is converted from an analog signal into a digital signal carried by IP packets that travel over the Internet. The digital signal is then converted back into a voice analog signal at the other end so that the caller can speak with a called party. VoIP uses the Internet as the transmission medium for telephone calls by sending voice data in packets using IP rather than by traditional circuit transmissions of the Public Switched Telephone Network (PSTN).

VoIP environments typically include one or more management facilities which are used to manage the various software modules that are part of the VoIP environment. One difficulty in managing the software modules arises when the management facilities and the software modules are from different object systems. Another problem arises in determining the types of objects supported by the software modules so that the management facilities can communicate with those objects. It would be desirable to have a mechanism that automatically registers the type of objects supported by the software modules and is able to bi-directionally convert the formats of communications sent between the management facility and the registered objects.

BRIEF SUMMARY

The illustrative embodiment of the present invention provides a mechanism for managing software modules in a VOIP environment. A component management agent is provided for each VOIP software component in the VOIP environment. The component management agent registers with a session management agent which is in communication with a session management software facility. The component management agent accepts registrations from each software module in the component that it represents. The software module registrations indicate the type of objects that the software module supports. Subsequent managed object requests received from the session management facility are automatically directed to the appropriate software modules based on the registration information. Additionally, the session management agent and component management agent perform format conversions for the managed object requests where the session management facility and software modules are utilizing different object systems.

In one aspect of the present invention a computer-implemented method for managing software modules in a VoIP environment that has multiple software components, where each software component is associated with at least one software module, includes the step of providing a component management agent for each of the software components. The method also includes the step of accepting, at each component management agent, a registration containing information from each of the software modules associated with the software component. The method also programmatically directs at the component management agent, based upon the received registration information, a managed object request to at least one software module associated with the software components.

In another aspect of the present invention a computer-implemented system for managing software modules in a VoIP environment includes multiple software components. Each software component is associated with at least one software module. The system also includes a component management agent for each of the multiple software components in the VOIP environment. The component management agent accepts a registration containing information from each of the software modules associated with the software component. The component management agent programmatically directs, based upon the received registration information, a managed object request to at least one software module associated with the software components. The system also includes a session management agent that is in communication with a session management facility.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

The management of distributed mixed-language objects presents some difficulties in VOIP environments. The present invention provides a mechanism for automatically registering object types used by the deployed VoIP components and ensuring that the management facility is able to communicate with the mixed language objects. Both the management facility and the deployed VOIP components are represented by agents. Component management agents representing the software modules associated with the respective VOIP components handle the registration of object types and subsequent routing of object management requests and the responses to the requests. Similarly a software management agent representing the management facility handles the language conversions necessary for the session management facility to communicate with software modules using mixed language objects.

Figure 1:
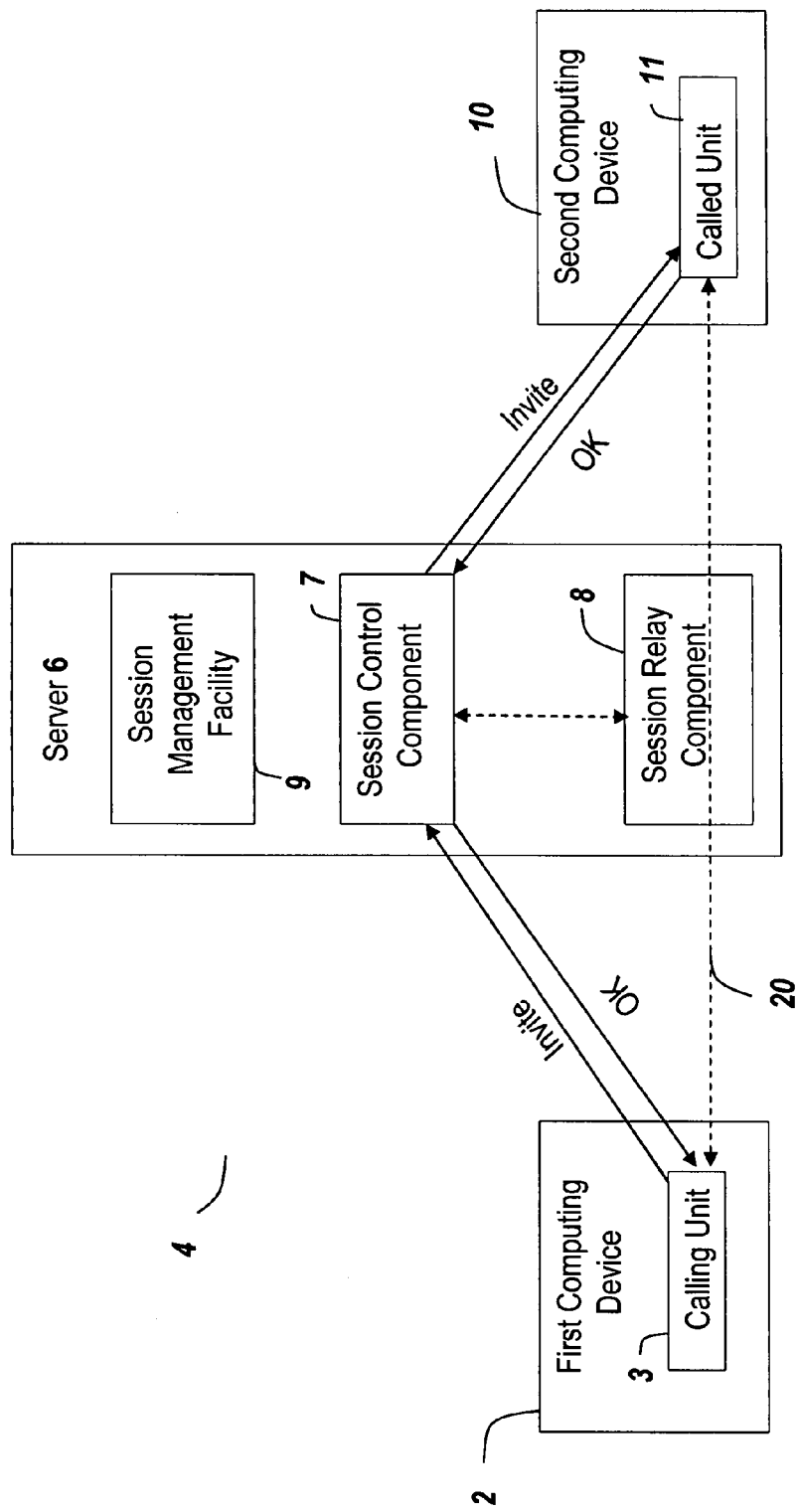
FIG. 1 depicts an environment suitable for practicing the illustrative embodiment of the present invention.

In order to better explain the present invention, a VoIP environment will first be discussed. FIG. 1 depicts an exemplary VoIP environment. A first computing device 2 interfaced with a network 4 includes or is accessible by a calling unit 3. The calling unit 3 may be a physical device such as a phone or alternatively may be a software process providing communication features. It will be appreciated that the phone itself may be equipped with a processor and capable of directly accessing and sending digital communications over the network 4. Alternatively the calling unit 3 may be a conventional analog phone that is connected to the first computing device 2 via a modem that converts the analog signal of the phone into a digital signal before transmitting the signal over the network 4. In the exemplary VoIP environment, the calling unit 3 sends a call or communication request to a session control component 7 that is executing on a server 6 in the network 4. The session control component 7 is a control agent that has access to registrar and location databases. The session control component 7 checks the database to determine the location of the called unit 11 on a second computing device 8 interfaced with the network 4. A connection request is sent to the called unit 11 by the session control component 7. If the called unit 11 is available, an acknowledgement is sent back to the session control component 7 and forwarded to the calling unit 3. The session control component 7 also passes on information to both the calling unit 3 and the called unit 11 enabling the formation of a session utilizing a communication stream 20 that is bi-directionally transmitted between the calling unit 3 and the called unit 11. The communication stream 20 may use RTP (Real Time Transport Protocol) or a similar transport protocol to transport voice, video or other data over the network 4. In one configuration, the communication stream 20 may be directed through one or more session relay components 8.

If both the calling unit 3 and the called unit 11 support the SIP protocol, the session control component 7 may use the Session Initiation Protocol (SIP) to establish and tear down call sessions. With SIP, the calling unit 3 sends an initial invitation identifying the called unit 11 to the session control component 7. The invitation includes the Session Description Protocol (SDP) for the calling unit 3. The SDP describes the media content of the desired session. For example, the SDP describes what IP ports to use in the session and the desired codecs. The session control component 7 may authenticate the user of the calling unit 3 that is initiating the invitation before taking additional action. An invitation message which includes the SDP of the calling unit 3 is then sent by the session control component 7 to the called unit 11. If the called unit 11 is able to take the call, and acknowledgement is sent back to the session control component 7 with the SDP of the called unit 11. The session control component 7 forwards the acknowledgement to the calling unit along with SDP of the called unit 11 that contains the necessary codec and port information so that the calling unit 3 and the called unit 11 can thereafter communicate. If both the calling unit and the called unit support the same SIP features, those features may be implemented in the established communication session.

The server 6 also includes a session management facility 9. The session management facility 9 manages the deployed VOIP components such as the session control component 7, session relay component 8 and session gateway component 12 (depicted in FIG. 2 and discussed further below). The session management facility 9 may be a web-based application for managing the VOIP services, resources, sessions, users and clients. The session management facility 9 may provide a common web browser interface for managing the application components and integrating fault, configuration, performance and security management for the VOIP functions. Additionally, the session management facility 9 may allow a user to manage call handling and voice mail features through a secure web browser and may provide an XML/SOAP interface for integration with third-party or customer developed management applications and systems.

The first and second computing devices 2 and 10 may be a workstation, server, laptop, PDA, IP-enabled phone or other computing device equipped with a processor and able to establish a communication session over the network 4. The calling unit 3 and called unit 11 may be analog phones, digital phones or software processes providing communication features. The network 4 may be the Internet, a Local Area Network (LAN), a Wide Area Network (WAN), a wireless network, or some other type of network over which the first computing device 2, second computing device 10 and server 6 can communicate. For illustration purposes, the session control component 7 is depicted as executing on a server 6 although it should be appreciated that the session control component may also operate on other types of computing devices.

Figure 2:
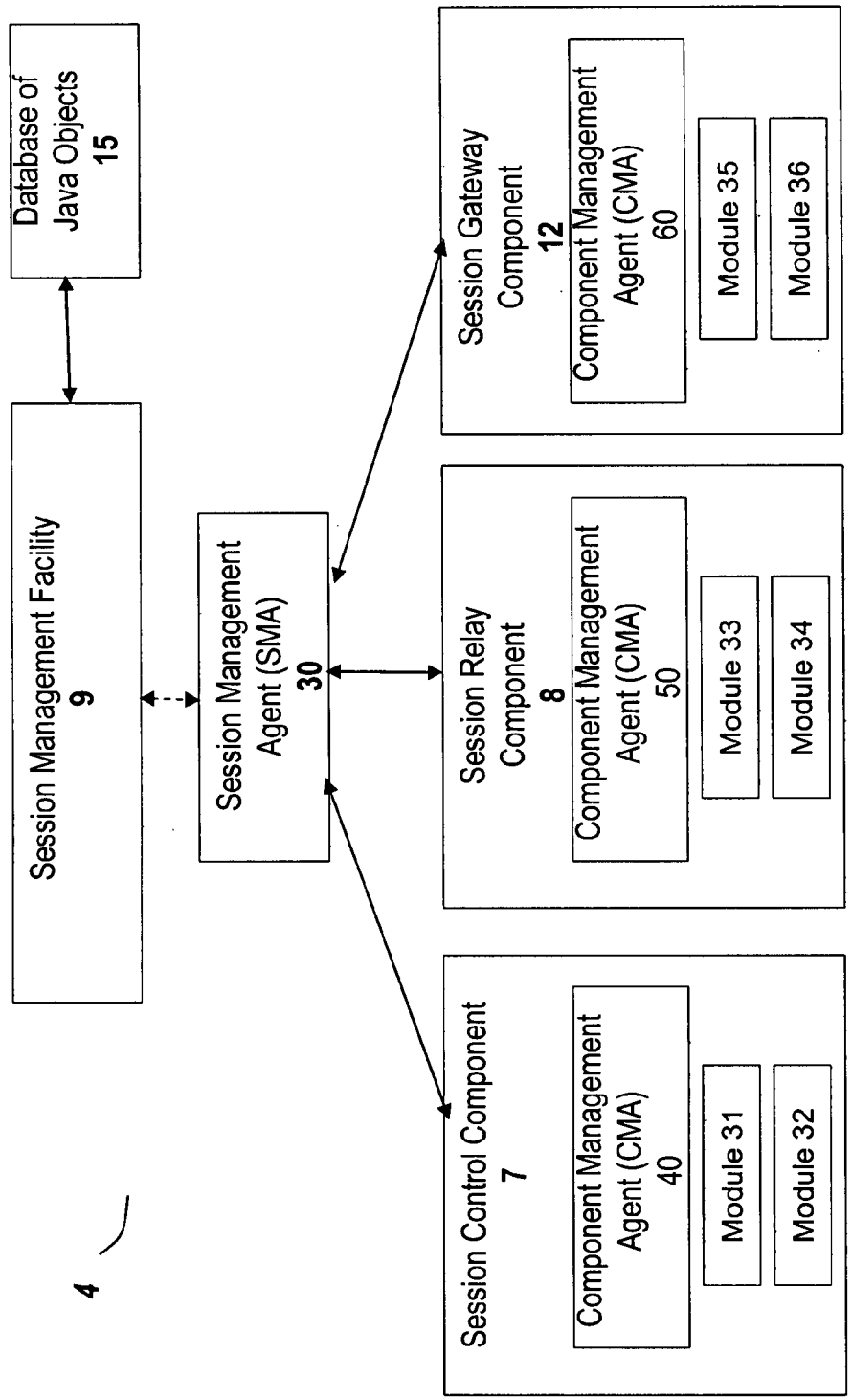
FIG. 2 depicts the network based components of FIG. 1 in greater detail.

The network deployed elements of the VOIP environment are discussed in more detail in FIG. 2. The session management facility 9 is in communication with a database 15 holding objects used by the session management facility to send managed object requests to the deployed software components. In one implementation the objects in the database 15 are Java objects and the session management facility 9 may generate Java-based managed object requests which are Java representations of Hessian objects. The managed object requests are sent to the deployed VoIP components via the SMA 30. The VoIP components may include a session control component 7, session relay component 8 and session gateway component 12. The session gateway component 12 is used to bridge a VoIP network and a traditional PSTN/PBX infrastructure so as to allow a user to place and receive a call with a PBX user or a user of the PSTN network. The session gateway 12 enables a user to migrate to VoIP while using the traditional PBX and maintaining communications with the public telephone infrastructure. Each of the deployed VoIP components 7, 8 and 12 is associated with a CMA 40, 50 or 60. The CMA 40, 50 or 60 receives managed object requests from the Session Management Facility 9 via the SMA 30. Upon start up, the CMA 40, 50 or 60 notifies the SMA 30 of its presence and of which components 7, 8 or 12 it represents. Each of the VoIP components may include one or more software modules 31, 32, 33, 34, 35 and 36. Each of the modules 31, 32, 33, 34, 35 and 36 registers with the CMA 40, 50 or 60 associated with its component. The registration indicates the object types it supports. In one implementation the registration indicates to the CMA that the object types supported by the software modules 31, 32, 33, 34, 35 and 36 are C++ representations of Hessian objects. As will be explained in more detail below, the CMA 40, 50 or 60 routes the managed object request to the appropriate software modules 31, 32, 33, 34, 35 or 36 after converting the format of the request.

When the managed object requests generated by the session management component are Java based and the software modules 31, 32, 33, 34, 35 and 36 support C++ representations of Hessian objects, the SMA 30 serializes the Java objects into binary form and forwards the data stream containing the managed object request to one or more CMAs 40, 50 or 60. The CMAs 40, 50 and/or 60 de-serialize the binary data stream containing the managed object request into a C++ object stream representing a Hessian object. In one implementation, a UML design tool which may be used to output both C++ and Java class may be utilized. The CMAs 40, 50 and/or 60 forwarded the object stream representing the managed object request to the appropriate software module based on the object type registration previously performed.

Responses from the software modules 31, 32, 33, 34, 35 and 36 to the managed object requests are received by the CMAs 40, 50 and/or 60. The CMAs serialize the response object stream (which may be a C++ representation of a Hessian object) into a binary data stream. The binary data stream containing the response to the managed object request is directed to the SMA 30. Upon receipt of the binary data stream representing the response, the SMA 30 de-serializes the binary data stream into an object stream (in one implementation, the binary data stream is de-serialized into a Java representation of a Hessian object) and forwards the object stream to the session management facility 9. In one implementation the same UML tool that was used to convert the managed object request from Java to C++ is used to perform the conversion from C++ to Java. The invention thus allows a programmatic way for q Java based session management facility 9 to communicate with C++ based software modules 31, 32, 33, 34, 35 and 36 in the deployed VoIP components.

Figure 3:
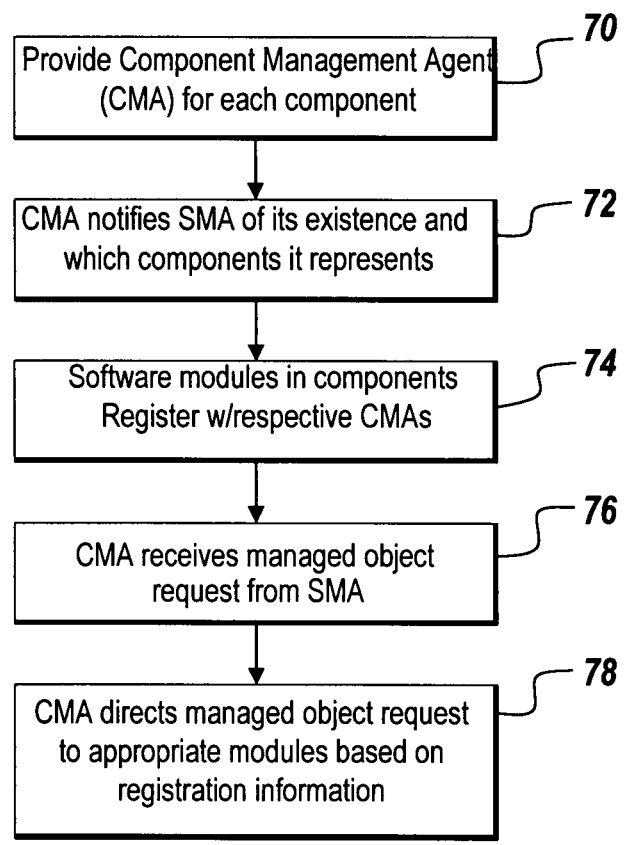
FIG. 3 is a flowchart of the sequence of steps followed by the illustrative embodiment handle managed object requests directed to software modules.

FIG. 3 is a flowchart of a sequence of steps that may be followed by the illustrative embodiment of the present invention in order to handle managed object requests directed to software modules in deployed VoIP components. The sequence begins by providing CMAs 40, 50 or 60 for each deployed software component 7, 8 and 12 (step 70). The CMA 40, 50 or 60 notifies the SMA 30 of its existence upon startup and informs the SMA as to which software component 7, 8 or 12 it represents (step 72). The software modules 31, 32, 33, 34, 35 and 36 in the deployed VoIP components register with their respective CMAs 40, 50 or 60 (step 74). The CMA 40, 50 or 60 subsequently receives a managed object request from the SMA 30 (step 76) and directs the managed object request to the appropriate software modules 31, 32, 33, 34, 35 and/or 36 based on the object registration information previously received (step 78).

Figure 4A:
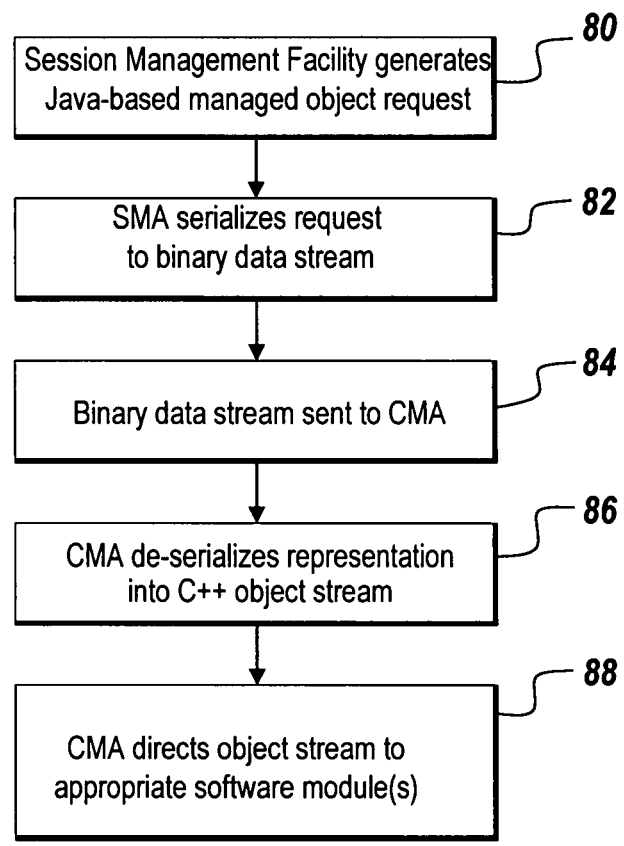
FIG. 4A is a flowchart of a sequence of steps followed by the illustrative embodiment to serialize and de-serialize managed object requests sent from the session management facility to one or more software modules.

The illustrative embodiment of the present invention allows management facilities generating managed object requests in a first language to communicate with deployed software modules that support object types written in a different language. FIG. 4A is a flowchart of a sequence of steps that may be followed by the illustrative embodiment to generate managed object requests in a mixed-language environment. The sequence begins when the session management facility 9 generates a Java-based managed object request (step 80). The SMA 30 then serializes the managed object request into a binary data stream (step 82). The binary data stream is sent to a CMA 40, 50 or 60 (step 84). Upon receipt of the binary data stream, the CMA 40, 50 or 60 de-serializes the binary data stream into an object stream such as a C++ representation of a Hessian object (step 86). The object stream is then directed to one or more software modules 31, 32, 33, 34, 35 and 36 based on the object registration information previously received by the CMA 40, 50 or 60 (step 88).

Figure 4B:
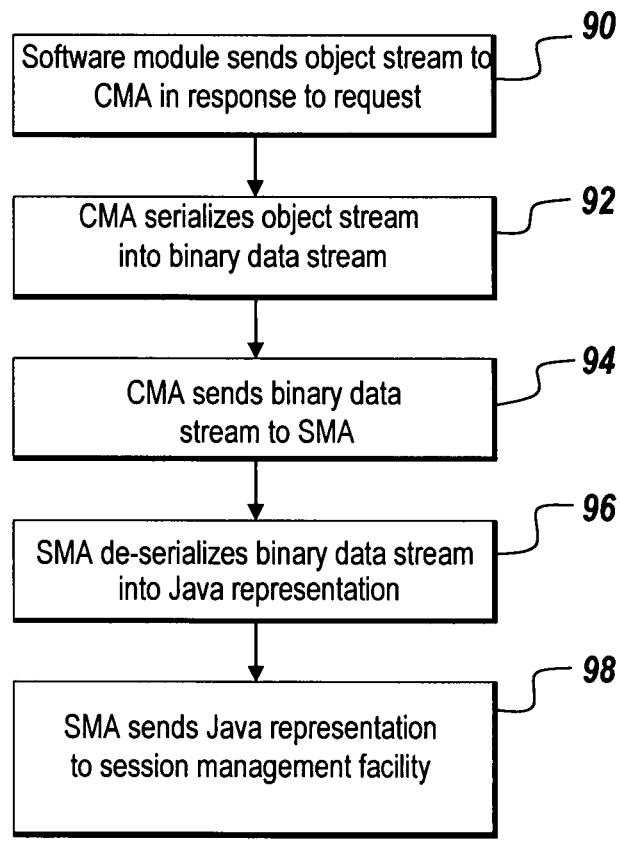
FIG. 4B is a flowchart of a sequence of steps followed by the illustrative embodiment to serialize and de-serialize responses sent from a software module to the session management facility.

A similar process is followed to handle the transmission of the software module(s) response to the managed object request to the session management facility. FIG. 4B is a flowchart of a sequence of steps followed by the illustrative embodiment of the present invention to transmit the software modules response to managed object requests. The sequence begins with a software module 31, 32, 33, 34, or 36 sending an object stream, such as a C++ representation of a Hessian object, to a CMA 40, 50 or 60 in response to a managed object request generated by the session management facility 9 (step 90). Alternatively, the object stream may also be a software module's autonomous request for managed object data from the session management facility. The CMA 40, 50 or 60 serializes the object stream into a binary data stream (step 92). The CMA 40, 50 or 60 then sends the binary data stream containing the response (or the autonomous request) to the SMA 30 (step 94). The SMA 30 de-serializes the binary data stream into an object representation, such as a Java representation of a Hessian object, (step 96) and then sends the object representation to the session management facility (step 98).

It should be appreciated that although the examples contained herein have discussed language conversions taking place between Java and C++, conversions to and from other languages are also possible within the scope of the present invention.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include FORTRAN, C, C++, C#, or JAVA. The software programs may be stored on or in one or more mediums as object code. Hardware acceleration may be used and all or a portion of the code may run on a FPGA or an ASIC. The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A computer-implemented method for managing software modules in a VoIP environment having a plurality of software components, each software component associated with at least one software module, the method comprising:
providing a respective component management agent of a plurality of component management agents for each respective software component of the plurality of software components in the VoIP environment; accepting, at each respective component management agent, a respective registration from each of the software modules containing information from each of the at least one respective software modules associated with each respective software component; and
directing programmatically by a respective component management agent of the plurality of component management agents, based upon the received registration information, a managed object request to at least one respective software module associated with the respective software component of the plurality of software components and each component management agent informs the session management agent which respective software component the respective component managed agent represents, and each respective component management agent routes the managed object to the respective software module after converting the request to a desired format.

2. The method of claim 1 wherein the managed object request is received from a session management agent that is in communication with a session management facility.

3. The method of claim 2 wherein the managed object request directed to the at least one software module by the component management agent is a representation of a Hessian object.

4. The method of claim 3 wherein the representation is a C++ representation of a Hessian object.

5. The method of claim 2, further comprising:
serializing, at the session management agent, a managed object request into a binary data stream directed to the component management agent.

6. The method of claim 5 wherein the managed object request is a Java representation of a Hessian object.

7. The method of claim 5, further comprising:
de-serializing, at the component management agent, the binary data stream into the managed object request prior to directing the managed object request to the at least one software module.

8. The method of claim 1, further comprising:
serializing a managed object received from the at least one software module, at a component management agent, into a binary data stream, the binary data stream directed to a session management agent in communication with a session management facility.

9. The method of claim 8 wherein the managed object is a C++ representation of a Hessian object.

10. The method of claim 9, further comprising:
de-serializing, at the session management agent, the binary data stream into a Java representation of a Hessian object; and
forwarding the Java representation to the session management facility.

11. The method of claim 1 wherein the registration accepted by the component management agent includes information regarding the type of objects each of the at least one software module supports.

12. A computer-implemented system for managing software modules in a VoIP environment, comprising: a server device having a plurality of software components for execution thereon, each respective software component associated with at least one respective software module; a respective component management agent~of a plurality of component management agents~for each respective component of the plurality of software components in the VoIP environment, each respective component management agent accepting a respective registration from each of the software modules containing information from each of the at least one respective software modules associated with the software component including information regarding object types supported by each of the at least one respective software modules, the component management agents programmatically directing, based upon the received registration information, a managed object request to at least one respective software module associated with the respective software component of the plurality of software components; and a session management agent that is in communication with a session management facility and each component management agent informs the session management agent which respective software component the respective component managed agent represents, and each respective component management agent routes the managed object to the respective software module after converting the request to a desired format.

13. The system of claim 12 wherein the session management agent serializes a Java representation of a Hessian object into a binary data stream and the component management agent de-serializes the binary data stream into a C++ representation of a Hessian object.

14. The system of claim 12 wherein the component management agent serializes a C++ representation of a Hessian object into a binary data stream and the session management agent de-serializes the binary data stream into a Java representation of a Hessian object.

15. A non-transitory computer readable storage medium for use with a computing device, the medium holding computer-executable instructions for managing software modules in a VoIP environment having a plurality of software components, each software component associated with at least one software module, the instructions comprising: instructions for providing a respective component management agent of a plurality of component management agents for each respective software component of the plurality of software components in the VoIP environment; instructions for accepting, at each component management agent, a respective registration from each of the software modules containing information from each of the at least one software modules associated with the respective software component; and instructions for directing programmatically by respective component management agents, based upon the received registration information, managed object requests to at least one respective software module associated with the respective software component of the plurality of software components and each component management agent informs the session management agent which respective software component the respective component managed agent represents, and each respective component management agent routes the managed object to the respective software module after converting the request to a desired format.

16. The medium of claim 15 wherein the managed object request is received from a session management agent that is in communication with a session management facility.

17. The medium of claim 16 wherein the managed object request directed to the at least one software module by the component management agent is a C++ representation of a Hessian object.

18. The medium of claim 16, further comprising:
instructions for serializing, at the session management agent, a managed object request into a binary data stream directed to the component management agent.

19. The medium of claim 18 wherein the managed object request is a Java representation of a Hessian object.

20. The medium of claim 18, further comprising:
instructions for de-serializing, at the component management agent, the binary data stream into the managed object request prior to directing the managed object request to the at least one software module.

21. The medium of claim 15, further comprising:
instructions for serializing a managed object received from the at least one software module, at a component management agent, into a binary data stream, the binary data stream directed to a session management agent in communication with a session management facility.

22. The medium of claim 21 wherein the managed object is a C++ representation of a Hessian object.

23. The medium of claim 22, further comprising:
instructions for de-serializing, at the session management agent, the binary data stream into a Java representation of a Hessian object; and
instructions for forwarding the Java representation to the session management facility.

24. The medium of claim 15 wherein the registration accepted by the component management agent includes information regarding the type of objects each of the at least one software module supports.

* * * * *